350-432 SR 4 C SEARCH ROOM
XR 4,181,439

United States Patent [19] 4,181,439
Tresch et al. [45] Jan. 1, 1980

[54] SMOKE DETECTOR WITH A CONICAL RING-SHAPED RADIATION REGION

[75] Inventors: Erwin Tresch, Zollikon; Zoltan Horvath, Mannedorf, both of Switzerland

[73] Assignee: Cerberus AG, Mannedorf, Switzerland

[21] Appl. No.: 777,397

[22] Filed: Mar. 14, 1977

[30] Foreign Application Priority Data

Apr. 1, 1976 [CH] Switzerland ........................ 4040/76
Sep. 6, 1976 [CH] Switzerland ........................ 11278/76

[51] Int. Cl.2 ............................................ G01N 21/00
[52] U.S. Cl. ................................... 356/338; 250/574; 350/189; 340/630
[58] Field of Search ............... 356/207, 103, 104, 338; 250/574; 340/237 S, 630; 350/189

[56] References Cited

U.S. PATENT DOCUMENTS

| | | | |
|---|---|---|---|
| 2,254,961 | 9/1941 | Harris | 350/189 |
| 3,185,975 | 5/1965 | Kompelien | 356/103 |
| 3,409,885 | 11/1968 | Hall | 340/237 S |
| 3,497,303 | 2/1970 | Enemark et al. | 356/103 |
| 3,999,855 | 12/1976 | Hirschfeld | 356/103 |

*Primary Examiner*—Vincent P. McGraw
*Attorney, Agent, or Firm*—Werner W. Kleeman

[57] ABSTRACT

An optical smoke detector comprising a radiation source which transmits radiation into a predetermined spatial region and a radiation receiver to which there is delivered the radiation which is scattered by particles located along the radiation path. The radiation source possesses a substantially conical ring-shaped radiation characteristic or pattern and the radiation receiver is arranged substantially at or along the cone axis.

27 Claims, 7 Drawing Figures

SMOKE DETECTOR WITH A CONICAL RING-SHAPED RADIATION REGION

BACKGROUND OF THE INVENTION

The present invention relates to a new and improved construction of an optical smoke detector of the type comprising a radiation source which transmits radiation throughout a predetermined spatial region, at least one radiation receiver arranged externally of the direct radiation region and to which there is delivered the radiation which is scattered by particles located in the radiation region.

With smoke detectors of this general character it is possible to select the radiation in the visible, infrared or ultraviolet wavelength range, depending upon the nature of the smoke particles to be detected. With such smoke detectors, as utilized for instance in the fire alarm art, the radiation receiver is not directly impinged or irradiated, rather arranged externally of the radiation range or region such that it only then receives radiation when radiation-scattering particles enter the radiation path and cause scattering of the radiation. Typical of such type optical smoke detectors are those disclosed in the commonly assigned U.S. Pat. No. 3,316,410, granted Apr. 25, 1976 and U.S. Pat. No. 3,760,395, granted Sept. 18, 1973, to which reference may be readily had, and the disclosure of which is incorporated herein by reference. As soon as the scattered radiation intensity, received by the radiation receiver, has attained a certain value, then a signal is delivered by a suitable evaluation circuit, for instance in the manner taught, by way of example, in Swiss Pat. No. 417,405, corresponding to U.S. Pat. No. 3,316,410 or the Japanese petty patent publications Sho Nos. 47-21577, 47-21578 and 48-2687 and the Japanese patent publication Sho No. 47-32797, the disclosure of which is incorporated herein by reference.

Heretofore known smoke detectors of this general character transmit the radiation by means of an optical system into a measuring chamber. The radiation receiver is arranged transversely with respect to the radiation direction such that it preferably can receive radiation which is scattered through an angle of 90°. The efficiency of such arrangement is, however, relatively poor, since the irradiation or impingement of the radiation receiver is extremely small when there prevails low smoke density in the measuring chamber. Therefore, such smoke detectors are associated with the drawback that when used as fire alarms they do not react early enough to the first traces of smoke originating when a fire breaks out.

It has already been attempted to make use of the fact that for most types of particles which are to be detected the forward radiation scattering—during which the receiving direction forms an acute angle with the radiation direction—is greater than the sideward scattering or rearward scattering. Hence, the radiation receiver is dispositioned such that it is just still located externally of the radiation bundle. However, the sensitivity increase which can be obtained with such smoke detectors falls within narrow limits, since even here there is only used a very small part of the scattered radiation. Additionally, the radiation must be focused or bundled extremely well in order that the radiation receiver is not impinged by direct peripheral or marginal radiation, rendering such equipment quite expensive and difficult to adjust.

SUMMARY OF THE INVENTION

Hence, with the foregoing in mind it is a primary object of the present invention to provide a new and improved construction of smoke detector which is not associated with the aforementioned drawbacks and limitations of the prior art proposals.

Another and more specific object of the present invention aims at eliminating the aforementioned drawbacks and providing an optical smoke detector possessing improved efficiency, correspondingly reduced power requirements and increased functional reliability, and which, when used as a fire alarm or indicator, gives a signal in a positive manner and at an incipient stage during the development of a fire, specifically in the presence of relatively low smoke concentration.

Now in order to implement these and still further objects of the invention, which will become more readily apparent as the description proceeds, the optical smoke detector of the present invention is manifested by the features that the radiation source possesses a substantially conical ring-shaped radiation characteristic or pattern and the radiation receiver is arranged substantially at or along the cone axis.

By focusing the radiation upon a conical surface-shaped zone or cone-shaped shell, there is achieved the beneficial result that a single radiation receiver can be arranged such that it can receive forwardly scattered radiation from all directions, however is not impinged by direct radiation since with the selected radiation pattern or characteristic practically no radiation is transmitted in the direction of the cone axis. Consequently, it is possible to obtain optimum efficiency. The requisite radiation pattern or characteristic can be obtained in different ways, for instance by radiation-conducting elements possessing a cone-shaped configured radiation outlet or by reflection or refraction at an ellipsoid of revolution or paraboloid of revolution or circular surfaces having eccentric and inclined or slanted axis of rotation.

BRIEF DESCRIPTION OF THE DRAWINGS

The invention will be better understood and objects other than those set forth above, will become apparent when consideration is given to the following detailed description thereof. Such description makes reference to the annexed drawings wherein throughout the various Figures there have been generally used the same reference characters for the same components and wherein.

DETAILED DESCRIPTION OF THE PREFERRED EMBODIMENTS

Figure 1:
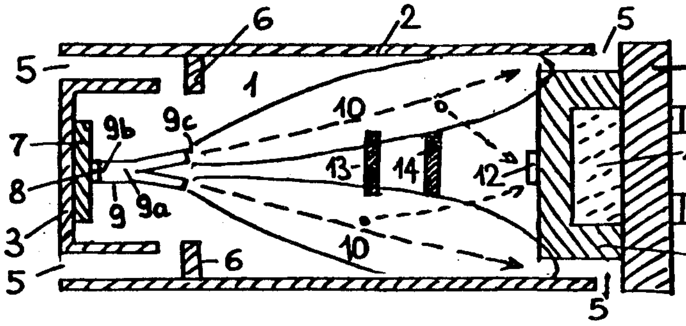
FIG. 1 is a sectional view of a first exemplary embodiment of optical smoke detector constructed according to the present invention.

Turning attention now to the drawings, it is to be understood that only enough of the structure of the optical smoke detector has been illustrated to enable those skilled in the art to readily understand the underlying principles and concepts of the invention. As will be apparent from the disclosure to follow conventional control—and evaluation circuits can be employed for processing the signal produced by the smoke detector, and since the invention is not concerned with any specific construction of evaluation circuit it is to be understood that optional circuits are avilable for use with the smoke detector of the invention, for instance as disclosed in certain of the heretofore mentioned prior art references. Now with the exemplary embodiment of smoke detector illustrated in FIG. 1, a substantially tubular-shaped housing 2 encloses a measuring chamber or volumetric space 1. Both ends of the housing 2 are closed by base plates 3 and 4 in such a manner that between the tubular housing 2 and the base plates 3 and 4 there are formed substantially ring-shaped inlet openings or apertures 5 for the entry of the monitored atmosphere or ambient air including the smoke particles or aerosols contained therein into the measuring chamber 1. Baffle plates 6 or equivalent structure can be arranged behind the inlet openings 5 in order to prevent entry of light directly from the outside into the measuring chamber 1.

A support or holder element 7 for a radiation emitting element 8 is mounted upon the base plate 3. In principle, the radiation emitting element 8 can be of random construction, for instance an incandescent lamp or a discharge lamp, but it is particularly advantageous to use radiation emitting elements having small dimensions, the radiation of which can be easily focused or bundled, or radiation emitting elements which already emit radiation in preferred directions. It is for this reason that light-emitting semiconductors, for instance laser diodes have been found to be extremely suitable, so-called LEDs. For smoke detectors which are used for fire alarms there can be beneficially employed, for instance, gallium arsenide diodes.

In the embodiment under consideration there has been selected a light-emitting diode 8 which transmits radiation preferably in the direction of the lengthwise axis of the detector device. By the use of optical means 9 which in conjunction with the radiation emitting element 8 defines the radiation source, this radiation is deflected such that it is focused preferably in a substantially conical ring-shaped space 10 about the lengthwise axis of the smoke detector, whereas almost no radiation is emitted in the direction of such axis. The radiation emitting element 8 thus has imparted to it a substantially conical-ring shaped radiation pattern or characteristic. In the embodiment under discussion this is realized through the use of optical means 9 in the form of a radiation-conducting element 9*a*, the inlet opening 9*b* of which is mounted at the light-emitting diode 8 and the outlet side 9*c* of which widens into a substantially funnel-like structure. This radiation-conducting element 9*a* can be formed of glass or a transparent plastic, for instance, available under the trademark "PLEXIGLAS." It can be formed of one piece or composed of a bundle of numerous thin glass fibers, e.g. optical fibers, and due to the total reflection within the glass fibers there is obtained a particularly good directional action.

At the opposite base plate 4 there is mounted a further support or holder element 11 for the radiation receiver 12. This radiation receiver 12 is located at the lengthwise axis of the detector device, so that it is practically not impinged by direct radiation emanating from the radiation emitting element 8, however receives from the substantially cone-shaped zone 10 radiation which is forwardly scattered by particles or the like located within the measuring chamber 1. By virtue of this arrangement, it is possible to have a single radiation receiver 12 detect the radiation emitted from a larger scattering region or range than was heretofore possible with conventional smoke detectors, and specifically, especially that spatial angular region in which the scattered radiation possesses a particularly great intensity. Hence, a smoke detector constructed in the aforedescribed manner exhibits increased sensitivity.

In order to prevent residual direct radiation emanating from the radiation emitting element 8 from impinging upon the receiver 12, it is advantageous to arrange screening diaphragms 13 and 14 or equivalent structure between the radiation emitting element 8 and the receiver 12. In this way it is possible to still further improve the sensitivity of the smoke detector.

Within a hollow space 15 of the support or holder element 11 there is arranged the electronic control—and evaluation circuitry for the radiation emitting element 8 and the radiation receiver 12. As mentioned, in principle, the design of such circuitry can be optional and, for instance, can correspond to the circuitry disclosed in certain of the previously referred to prior art publications, to which reference may be readily had. Such is furthermore connected by means of the contacts or pins 16 with the exterior of the base plate 4, with which there can be connected not particularly illustrated lines or conductors leading to a central signalling station, as is well known in this technology. As is also conventional in this art, a signal is then transmitted by means of these lines to the central signalling station as soon as the smoke density in the measuring chamber 1 has exceeded a predetermined value.

Figure 2:
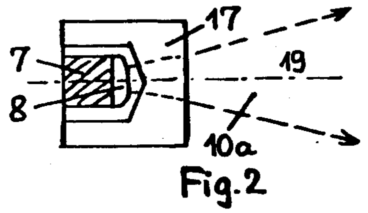
FIG. 2 illustrates a further possible construction of radiation source for use with the optical smoke detector.

FIG. 2 illustrates a further variant construction of radiation source processing a likewise substantially conical ring-shaped radiation pattern or characteristic. In this embodiment a prism of revolution 17 is arranged forwardly of the light-emitting element 8 and the axis of rotation 19 is located at the lengthwise axis of the detector device. In this case the radiation which is preferably transmitted in axial direction is deflected by the surface of revolution to all sides through a certain angle, just as with a prism, so that the maximum intensity of the radiation is located in a substantially conical surface-shaped zone 10*a* disposed about the lengthwise axis of the detector device. With this simple constructional embodiment there must be, however, accepted that there is still present a certain radiation intensity in the axial direction which must be absorbed by suitable screening diaphragms.

Figure 3:
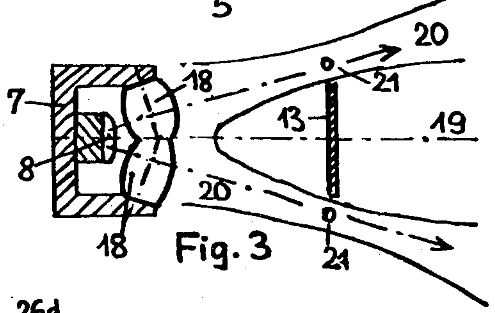
FIG. 3 illustrates still another possible construction of radiation source.

With the further embodiment of radiation source as shown in FIG. 3 this drawback is extensively avoided. Here, a solid or body of revolution 18 formed of a biconvex lens is arranged in front of the light-emitting diode 8, and the rotational axis 19 which here also coincides with the lengthwise axis of the detector device is disposed eccentrically and at an inclination to the lens axis 20. With this arrangement the radiation transmitted by the light-emitting diode 8 is focused upon a focusing ring 21 and exactly concentrated at that region of the measuring chamber 1 where the radiation scattering produced by the smoke particles can be taken-up or captured particularly well by the radiation receiver 12.

However, the desired substantially conical ring-shaped radiation pattern or characteristic also can be accomplished by means of reflection or refraction at other ellipsoid surfaces of revolution possessing eccentric and inclined rotational axis, wherein there are enclosed the same or infinitely large primary radii of curvature, i.e., surfaces of revolution of parabolas, circles and lines.

Figure 4:
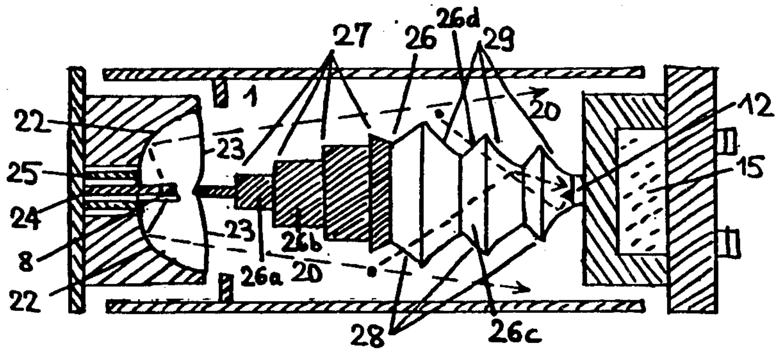
FIG. 4 is a sectional view of a further embodiment of optical smoke detector.

In the arrangement of FIG. 4, the light-emitting diode 8 is arranged in a reflector 22 which is constructed as an ellipsoid of revolution, wherein the primary or major axes of the generating ellipses are disposed at an inclination to the rotation- or device axis. The reflector 22 with the light-emitting diode 8 is molded or cast with a transparent plastic, the surface 23 of which is constructed as a surface of revolution having a circular arc as the generatrix, and the center of the circle is located externally of the rotational axis. Due to this construction there is again obtained a really good ring-shaped focusing of the radiation.

In order to further attenuate the radiation in the axial direction, in this embodiment there is used as the light-emitting element 8 gallium arsenide chip, wherein the radiation preferably departs in a ring-configuration towards the sides, whereas the contact surfaces located at the top and bottom of the chip, and through which no radiation escapes, are located at the device axis. The contact surfaces are connected by means of a central line or conductor 24 and a substantially ring-shaped conductor 25 with the electronic control circuitry 15 at the opposite base plate 4.

In order to screen undesired radiation and to improve and augment a more complete absorption of scattered radiation and the transmission thereof to the radiation receiver 12 there is provided at the center of the measuring chamber 1 a rotationally symmetrical plastic body 26. The front portion 26a confronting the radiation source 12 is offset in a step-like configuration and blackened at least at the surface 26b. The step-like or ring-shaped shoulders 27 function in the same manner as the screening diaphragms of the previously described embodiments. On the other hand, the rear portion 26c of this body of revolution 26 is constructed of transparent plastic and likewise possesses a number of ring-shaped shoulders or projections 28 with inclined radiation entry surface 26d, through which the scattered radiation can enter as totally and unobstructedly as possible into the interior of the body 26. The other substantially funnel-shaped tapering surfaces 29 serve as reflectors, so that the scattered radiation is collected in a large spatial angular range and transmitted to the radiation receiver 12 mounted at the end of the last funnel. In this way it is possible to further improve the efficiency in contrast to the arrangement of FIG. 1.

Figure 5:
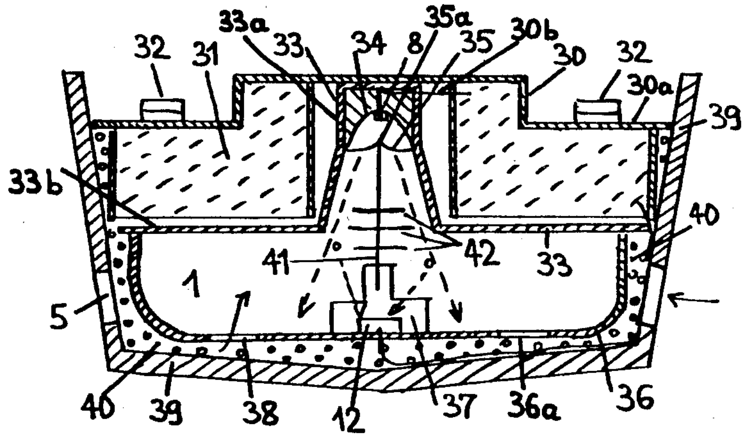
FIG. 5 is a sectional view of still another embodiment of optical smoke detector.

FIG. 5 illustrates a further exemplary embodiment of optical smoke detector which additionally is manifested by its particularly simple construction and correspondingly easy and uncomplicated assembly, and therefore concomitant low production costs.

Here there will be seen provided a socket portion 30, at the upper surface 30a of which there are provided contacts 32 or the like which, for instance, can be constructed as bayonet locking means, for connecting the smoke detector at suitable signal lines leading to a central signalling station. In the hollow compartments or spaces 31 there are embedded, by molding or casting, for instance the components of a conventional electrical control- and evaluation circuit, which may be of the type previously referred to. In a central bore 30b of the socket portion or socket 30 there is inserted a part or component 33 which is substantially pot-shaped at its central region 33a and disk-shaped at its edge 33b. This insert part or member 33 contains at its central region 33a the radiation emitting element 8 with the associated optical system i.e. a reflector 34 and a lens surface 35. The optical system can be constructed, for instance, like that shown in the embodiment of FIG. 4, or according to one of the other embodiments disclosed herein, and produces the above-described substantially conical ring-shaped radiation pattern.

A substantially hood-shaped component 36 is mounted upon the disk-shaped edge 33b of this pot-shaped part 33. The pot-shaped part 33 and the hood-shaped component or part 36 collectively enclose the measuring chamber or compartment 1. For the entry of the ambient air or atmosphere into the measuring chamber 1 suitable openings 36a are provided at the hood-shaped component or support element 36. At the inside at the center of the measuring chamber 1 there is mounted upon such blood-shaped component 36 a transparent body or body member 37 which encloses the radiation receiver 12 in such a manner that scattered radiation from the entire half of the space or chamber can impinge upon the radiation receiver 12. At the center of the plastic component or body 37 there is inserted a pin-shaped structure 41 which carries a number of diaphragms 42 for screening the direct radiation from the radiation receiver 12. The free end of this pin 41 presses or fits into a depression 35a of the surface of revolution, i.e. lens surface 35 of the radiation source, and thus, fixes the individual components with respect to one another.

A housing 39 is mounted upon the entire structure. Openings or apertures 5 provided in the housing 39 allow for entry of the air into the interior thereof. It is advantageous to fill the intermediate space between the housing 39 and the hood-shaped component or part 36 with an open or large pore, black dyed polyester foam 40 which is air pervious, however extensively light impervious. This foam material or foam 40 at the same time serves to press the different parts against one another and for the fixation thereof. In the event that the foam material 40 is sufficiently light impervious, then the openings 36a in the hood-shaped component 36 can be arranged directly opposite the outer openings 5 in the housing 39, or instead of a hood 36 there can be employed a simple bracket composed of a number of holding webs. In this way there is additionally rendered possible an improved and more rapid air entry into the measuring chamber 1, so that a smoke detector constructed in this manner is capable of signalling at a more incipient combustion state than heretofore possible any increase of the smoke concentration beyond a certain threshold value. Owing to the special radiation characteristic or pattern and corresponding arrangement of the radiation receiver 12, the optical smoke detector possesses apart from the above-mentioned advantages also increased sensitivity by virtue of the better utilization of the scattered radiation.

With the previously described radiation sources, the radiation transmitted rearwardly by the light-emitting or radiation-emitting element, in the direction of the reflection surface, is focused almost optimumly in a conical jacket-shaped or conical surface-shaped region. On the other hand, the forwardly directed radiation surrounding the axis of rotation is lost. Additionally, a certain radiation intensity still prevails in the axial direction, so that the radiation receiver arranged at that location must be screened from the direct radiation by a complicated diaphragm system.

Figure 6:
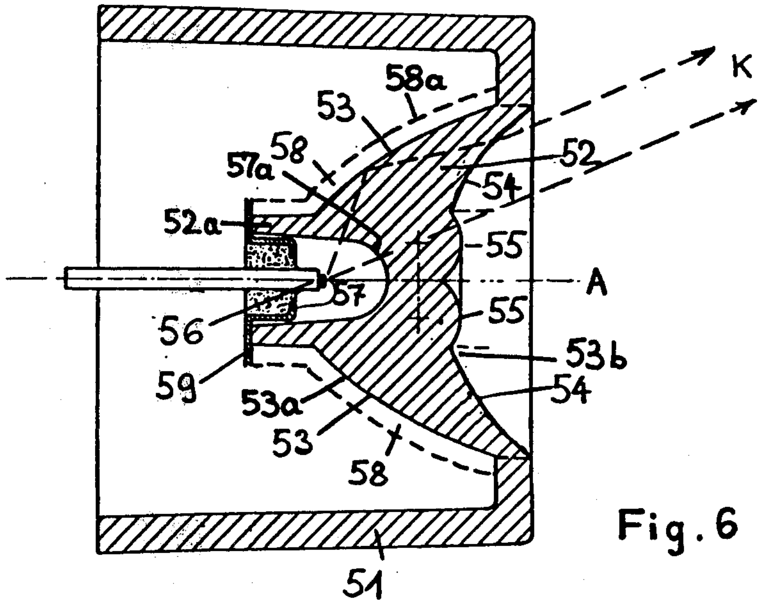
FIG. 6 illustrates in sectional view a further construction of radiation source.

Now when using the radiation source shown in FIG. 6 it is possible to eliminate this drawback for the most part and to still further improve the efficiency of the smoke detector. With this radiation source there is inserted into a sleeve 51 a body member or body 52 serving as an optical focusing element. This body member 52 can be formed of radiation-refractive material, for instance a suitable plastic or glass. The sleeve 51 can be constructed of the same material as the body member 52 or, for instance, as a metallic tube. The rear surface 53 of the body member 52 has the shape of a surface of revolution of a parabola, ellipse or a circle, and the axes of such curves extend at a slant or inclination with respect to the rotational axis A and the center is located externally of the axis A respectively. A suitable reflective coating 53*a* is applied to such surface 53 to form a reflector. The front surface 53*b* which is not reflective, in other words, pervious to radiation, consists of two concentric regions or zones 54 and 55 which refract the penetrating radiation in different ways. Both surface components or regions 54 and 55 are again constructed as surfaces of revolution of a parabola, ellipse, a circle, or, in the unusual case, a straight line, and the rotational axis again slants or is eccentric. The outer surface region or zone 54, which surrounds in a substantially ring-shaped manner the inner region or zone 55, also can be constructed as a plane, and the inner zone or region 55 also as a conical surface.

A radiation-emitting element 56, for instance a light- or infrared-transmitting diode LED, is mounted at the lengthwise axis A in a central hollow portion or cavity 57 provided at the rear face or side 52*a* of the body member 52. The central hollow portion or cavity 57 may possess a domed, flat or conical-shaped front surface or region 57*a*. The radiation-emitting element 56, for instance as mentioned the luminiscent diode, is specifically arranged at the focal point of the parabola or ellipse generating the surface 53. Consequently, there is obtained the result that radiation impinging at the reflecting surface 53, after refraction at the surface zone 54, is directed with a relatively large degree of focusing in a substantially conical ring-shaped or conical jacket-shaped zone K around the axis A.

On the other hand, the radiation which is directed forwardly, approximately in the axial direction, is refracted at the front side of the hollow portion or cavity 57 and the surface region or zone 55. Both surfaces 55 and 57 are constructed and arranged such that the radiation-emitting diode 56 likewise is located at the focal point of the optical system composed of both surfaces 55 and 57. Additionally, the degree of slanting or eccentricity of the axis of rotation is chosen such that the radiation transmitted forwardly by the diode 56 is directed to the same conical ring-shaped zone K as the radiation transmitted to the reflective surface 53. Consequently, it is possible to make use of a greater portion of the radiation transmitted by the radiation-emitting element 56 than heretofore, and thus, to further improve upon the efficiency of a smoke detector constructed with such radiation source. Additionally, with the described arrangement there is practically no longer transmitted any radiation directly in the axial direction, so that there can be dispensed with the need to resort to complicated screening of the radiation receiver arranged at the lengthwise axis of the smoke detector.

As mentioned, the sleeve or sleeve member 51 and the optical focusing or body member 52 can be formed of the same material, for instance a transparent plastic and can be also formed of one piece. Instead of this arrangement it also can be advantageous to construct the sleeve 51 of a different material, for instance metal, and an inner component 58, shown in phantom lines in FIG. 6, can be bent back and drawn inwardly. The surface of this component 58 is then coated to be reflective, as generally indicated by reference character 58*a*, and forms a reflecting surface corresponding to the previously discussed reflecting surface 53, and the shape of the surface again corresponds to a slanted axis conical section-revolution surface. After the rear opening 59 is closed by insertion of the radiation emitter 56, it is then possible to cast or mold the interior of the reflector 53, i.e. the cavity 57 with a suitable transparent plastic and there is thus eliminated such cavity or hollow portion 57. By means of a suitably formed punch it is then possible to bring the structure into the desired shape, prior to solidification of the front surface 54, 55.

Figure 7:
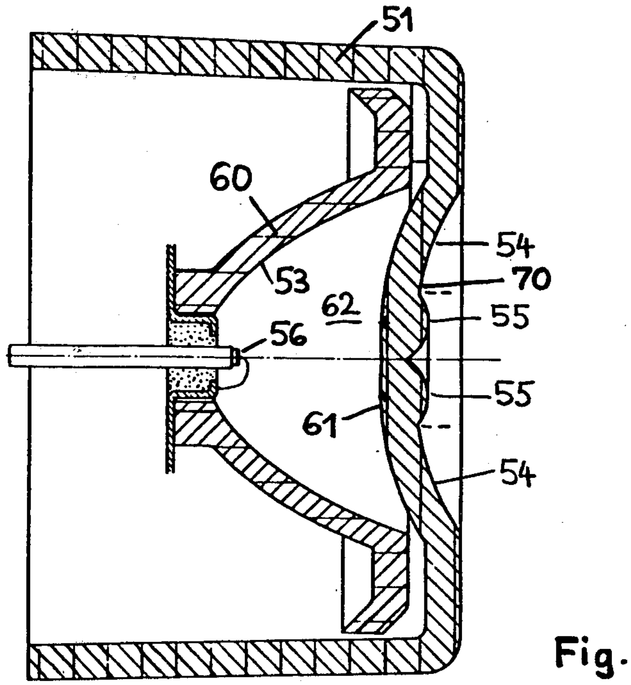
FIG. 7 illustrates in sectional view still another variant construction of radiation source.

FIG. 7 illustrates a similar radiation source wherein the sleeve 51 and the reflector 60 are designed as separate components. With this arrangement the sleeve 51 is closed by a radiation-refractive front surface 70 which possesses two concentric zones or regions 54 and 55, the shape of which corresponds to that of the arrangement of FIG. 6 previously discussed. The inner surface 61 likewise can consist of two analogous type zones or regions or can be constructed as a conical surface. The surface of the reflector portion or reflector 53 is again formed for instance analogous to the structure of FIG. 6 and constructed to be radiation-reflective, as previously considered. Here also there is inserted into the reflector 60 a radiation-emitting element 56.

If the pre-fabricated components, i.e. the sleeve 51 and the reflector 60 are assembled, then there is again achieved the effect that the radiation directed laterally and rearwardly is focused by means of the reflecting surface or reflector 53 and the zone or region 54 in substantially conical jacket-shaped zone or conical shell, and at the same time the forwardly directed radiation is transmitted by refraction at the zone 55 into the same conical jacket-shaped region or zone and does not reach the lengthwise axis A. Moreover, the intermediate space 62 between the reflector 60 and the front side of face 61 of the sleeve 51 can also be filled with a transparent molding or casting mass.

Also when using this radiation source it is possible to further improve the efficiency of the optical smoke detector due to optimum utilization of the radiation and to decrease the power requirements.

Finally, it is here mentioned that details of other advantageous constructions of radiation receiver portions of the optical smoke detector, which may be used with the herein described detectors, constitute subject matter of our commonly assigned United States patent application Ser. No. 777,396, filed Mar. 14, 1977, and entitled "Smoke Detector," to which reference may be readily had and the disclosure of which is incorporated herein by reference.

While there are shown and described present preferred embodiments of the invention, it is to be distinctly understood that the invention is not limited thereto, but may be otherwise variously embodied and practiced within the scope of the following claims. Accordingly,

We claim:

1. A smoke detector comprising: a radiation source comprising a radiation emitting element for emitting radiation throughout an extended spatial region;

said radiation source further comprising optical means structured to focus the predominant part of the radiation into a substantially conical ring-shaped radiation region in order to thereby increase the efficiency of smoke detection;

a radiation receiver arranged to receive radiation scattered by particles located in the substantially ring-shaped radiation region; and said radiation receiver being located substantially along the cone axis.

2. The smoke detector as defined in claim 1, wherein:

said optical means comprising at least one optical deflecting surface generated by revolution of a conical section curve around said cone axis.

3. The smoke detector as defined in claim 2, wherein:

said conical section curve is generated by an eccentrical revolution of a conical section curve around said cone axis.

4. The smoke detector as defined in claim 2, wherein:

said conical section curve is generated by a slanted revolution of a conical section curve around said cone axis.

5. The smoke detector as defined in claim 1, wherein:

said radiation source transmits the radiation throughout a large aperture angle.

6. The smoke detector as defined in claim 2, wherein for producing said substantially conical ring-shaped radiation region:

said optical means provide ellipsoid surfaces of revolution containing substantially elliptical generatrixes enclosed by predetermined primary radii of curvature.

7. The smoke detector as defined in claim 6, wherein:

said predetermined radii of curvature are the same.

8. The smoke detector as defined in claim 6, wherein:

said predetermined radii of curvature are infinite.

9. The smoke detector as defined in claim 6, wherein:

said ellipsoid surfaces of revolution are refractive surfaces.

10. The smoke detector as defined in claim 6, wherein:

said ellipsoid surfaces of revolution are reflective surfaces.

11. The smoke detector as defined in claim 1, wherein for producing said substantially conical ring-shaped radiation region there is provided:

said optical means in the form of a body of revolution of a lens section having a predetermined axis of rotation.

12. The smoke detector as defined in claim 11, wherein:

said axis of rotation is eccentric and slanted with respect to said cone axis.

13. The smoke detector as defined in claim 2, wherein for producing said substantially conical ring-shaped radiation region:

said optical means embody means providing a respective reflecting ellipsoid surface of revolution and a refractive ellipsoid surface of revolution containing eccentric and slanted rotational axes.

14. The smoke detector as defined in claim 1, further including:

at least one radiation-screening diaphragm arranged between said radiation source and said radiation receiver.

15. The smoke detector as defined in claim 14, wherein:

said diaphragm comprises a body having a blackened surface and arranged approximately at the lengthwise axis of the smoke detector;

said body being constructed to possess substantially ring-shaped shoulders.

16. The smoke detector as defined in claim 1, further including:

a radiation-conductive body arranged in front of the radiation receiver;

said radiation-conductive body being provided with substantially ring-shaped entry surfaces for scattered light and substantially funnel-shaped tapering reflection surfaces.

17. The smoke detector as defined in claim 1, further including:

a socket plate;

an insert member provided for said socket plate;

means incorporating said optical means provided for the radiation emitting element for producing the substantially conical ring-shaped radiation region and arranged in said insert member mounted at said socket plate;

a support element arranged along the lengthwise axis of the smoke detector and mounted at the insert element;

said radiation receiver being mounted at said support element;

spacer pin means carrying screening diaphragm means;

said spacer pin means being provided between said radiation source and said radiation receiver;

said insert member and said support element being mounted at said socket portion;

a housing mounted at said socket portion; and said housing being provided with air inlet openings.

18. The smoke detector as defined in claim 17, wherein:

said housing has an inner surface which is lined with an air pervious, open pore foam material.

19. The smoke detector as defined in claim 6, wherein:

said optical means provides an additional refractive ellipsoid surface of revolution having a predetermined axis of rotation, and the elliptical generatrixes of which are enclosed by predetermined primary radii of curvature;

said additional surface of revolution containing a reflecting surface and two refractive surfaces arranged and constructed such that the radiation transmitted by said radiation-emitting element in the direction of the reflecting surface in conjunction with one of the refractive surfaces is focused within a substantially conical jacket-shaped zone and the radiation transmitted by the radiation-emitting element in the direction of the other refractive surface is focused in the same substantially conical jacket-shaped zone.

20. The smoke detector as defined in claim 19, wherein:

said additional refractive ellipsoid surface of revolution has an eccentric and slanted axis of rotation.

21. The smoke detector as defined in claim 19, wherein:

said primary radii of curvature are equal to one another.

22. The smoke detector as defined in claim 19, wherein:

said primary radii of curvature are infinite.

23. The smoke detector as defined in claim 19, wherein:

said radiation-emitting element is located at the focal point of the generatrix of the reflecting surface.

24. The smoke detector as defined in claim 19, further including:

means defining a refracting surface portion;

a radiation-refractive medium arranged between said refracting surface portion and both of said refractive surfaces.

25. The smoke detector as defined in claim 24, wherein the radiation-refractive medium comprises a transparent plastic.

26. The smoke detector as defined in claim 19, further including:

a radiation-refractive medium filling an intermediate space between the reflecting surface and the refractive surfaces.

27. The smoke detector as defined in claim 26, wherein:

said radiation-refractive medium comprises a transparent plastic.

* * * * *